(12) United States Patent
Eastep et al.

(10) Patent No.: US 10,469,347 B2
(45) Date of Patent: Nov. 5, 2019

(54) ACCURATE NETWORK POWER ESTIMATIONS TO IMPROVE PERFORMANCE IN LARGE DISTRIBUTED COMPUTER SYSTEMS

(71) Applicant: Intel Corporation, Santa Clara, CA (US)

(72) Inventors: Jonathan M. Eastep, Portland, OR (US); Eric R. Borch, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 143 days.

(21) Appl. No.: 15/081,444

(22) Filed: Mar. 25, 2016

(65) Prior Publication Data

US 2017/0279926 A1  Sep. 28, 2017

(51) Int. Cl.
G06F 15/16   (2006.01)
H04L 12/26   (2006.01)
H04L 12/911  (2013.01)
H04L 12/24   (2006.01)

(52) U.S. Cl.
CPC .............. H04L 43/08 (2013.01); H04L 43/12 (2013.01); H04L 41/142 (2013.01); H04L 43/045 (2013.01); H04L 47/82 (2013.01)

(58) Field of Classification Search
CPC ....... H04L 67/36; H04L 43/045; H04L 43/08; H04L 47/82; H04L 67/10; H04L 43/0882; Y02D 10/20; Y02D 10/30; Y02D 10/157; Y02D 50/00; Y02D 70/324; Y02D 70/326; G06F 1/3278
See application file for complete search history.

(56) References Cited

U.S. PATENT DOCUMENTS

| | | | |
|---|---|---|---|
| 8,601,287 B1 | 12/2013 | Weber et al. | |
| 8,811,377 B1 | 8/2014 | Weston et al. | |
| 2013/0262197 A1* | 10/2013 | Kaulgud | G05B 13/02 705/14.1 |
| 2014/0280447 A1* | 9/2014 | Kim | H04L 67/10 709/201 |

(Continued)

OTHER PUBLICATIONS

International Search Report and Written Opinion for International Patent Application No. PCT/US2017/018778, dated May 24, 2017, 5 pages.

(Continued)

*Primary Examiner* — Ryan J Jakovac
(74) *Attorney, Agent, or Firm* — Jordan IP Law, LLC

(57) ABSTRACT

Systems, apparatuses and methods may provide for a plurality of node-level agents, wherein each node-level agent aggregates network statistics information from a plurality of probes associated with a communications interface. Additionally, one or more job-level agents may be communicatively coupled to the plurality of node-level agents, wherein each job-level agent aggregates network statistics information from two or more of the node-level agents. Moreover, a system-level agent may be communicatively coupled to the job-level agent(s). The system-level agent may generate a power model based on aggregated network statistics information from the job-level agent(s) and propagate the power model to the node-level agents via the job-level agent(s).

19 Claims, 7 Drawing Sheets

(56) References Cited

U.S. PATENT DOCUMENTS

| | | | |
|---|---|---|---|
| 2015/0043410 A1 | 2/2015 | Chaturvedi et al. | |
| 2015/0215177 A1 | 7/2015 | Pietrowicz et al. | |
| 2015/0301572 A1* | 10/2015 | Zhou | G06F 1/3203 |
| | | | 713/320 |
| 2016/0056916 A1* | 2/2016 | Hassan | H04W 72/082 |
| | | | 370/252 |
| 2016/0370843 A1* | 12/2016 | Gatson | G06F 1/3234 |
| 2017/0099210 A1* | 4/2017 | Fardid | H04L 45/02 |

OTHER PUBLICATIONS

International Preliminary Report on Patentability for International Patent Application No. PCT/US2017/018778, dated Oct. 4, 2018, 10 pages.

\* cited by examiner

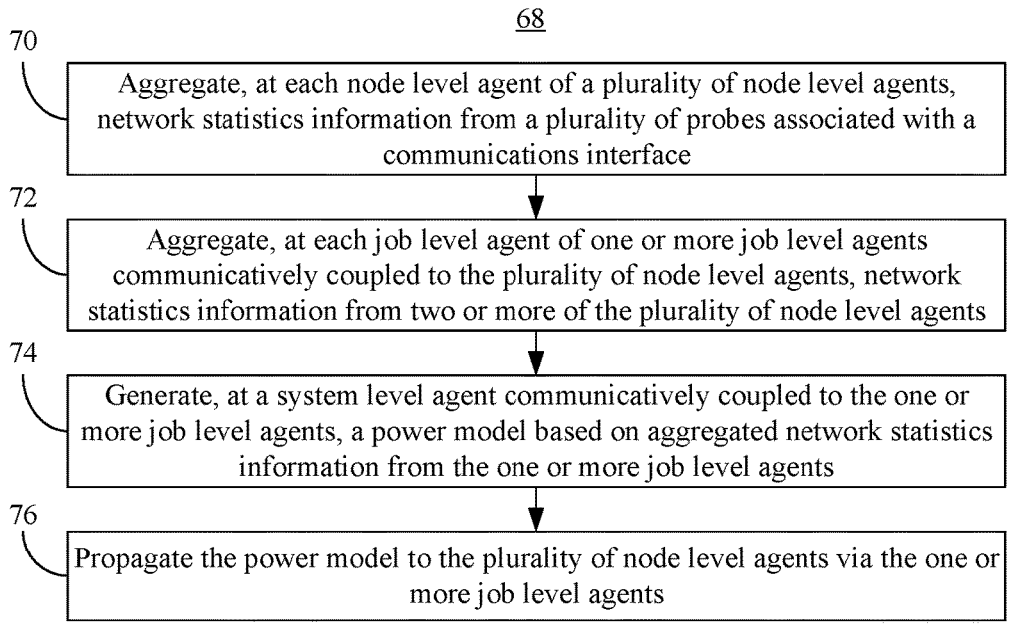
FIG. 6
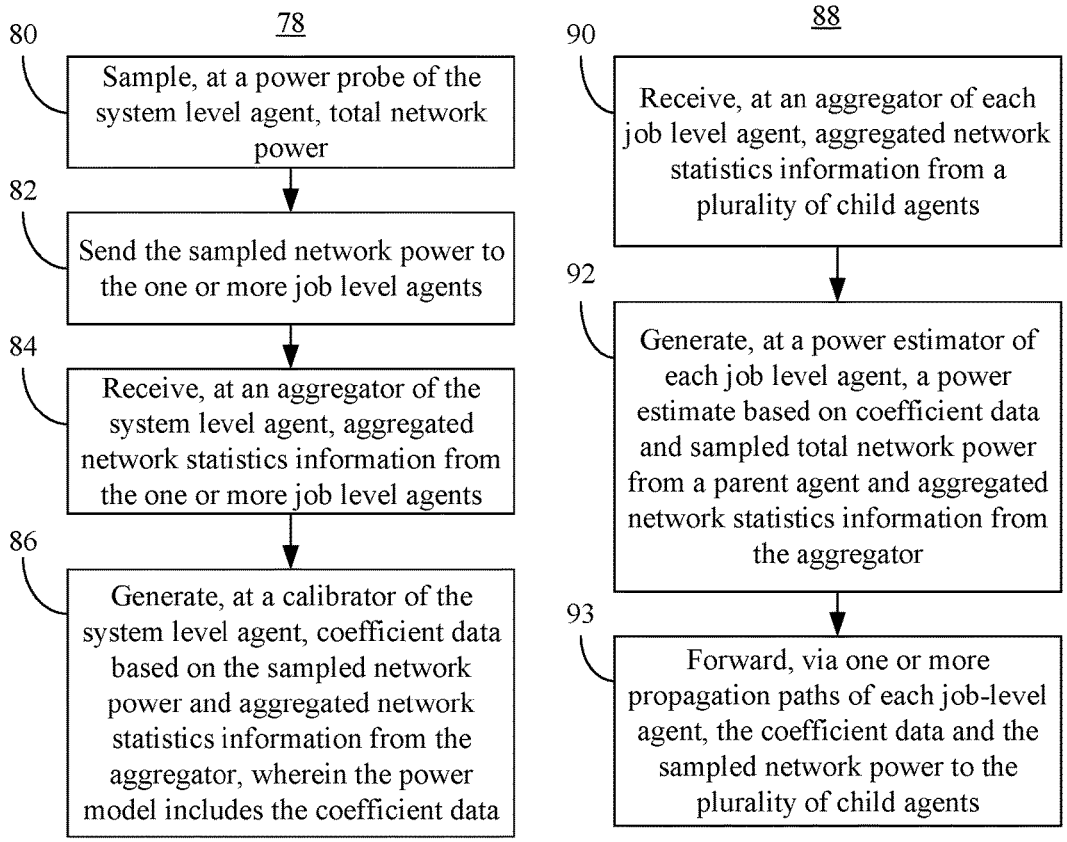
FIG. 7
FIG. 8

US 10,469,347 B2

ACCURATE NETWORK POWER ESTIMATIONS TO IMPROVE PERFORMANCE IN LARGE DISTRIBUTED COMPUTER SYSTEMS

GOVERNMENT INTEREST STATEMENT

This invention was made with Government support under contract number H98230-13-D-0124 awarded by the Department of Defense. The Government has certain rights in this invention.

TECHNICAL FIELD

Embodiments generally relate to power management in distributed computer systems. More particularly, embodiments relate to accurate network power estimations to improve performance in large distributed computer systems.

BACKGROUND

The scale and performance of large distributed computing systems may be limited by power constraints, both at the site and system level. Future systems may run under a power bound to ensure that the site and system stays within power limits, wherein the limits may derive from constraints on operational costs or limitations of the cooling and power delivery infrastructure. Bounds on system power may be enforced by actively controlling the power consumption of each concurrent job running in the system. Conventional technologies for bounding job power may be designed for systems that rarely approach power bounds. As such, conventional technologies may rely on conservative guard bands that waste power and use inefficient mechanisms for reducing power that substantially degrade job performance. Indeed, communications network power is one component of job power for which current approaches tend to employ overly conservative guard bands on a continual basis.

BRIEF DESCRIPTION OF THE DRAWINGS

The various advantages of the embodiments will become apparent to one skilled in the art by reading the following specification and appended claims, and by referencing the following drawings, in which:

FIG. 6 is a flowchart of an example of a method of operating a hierarchical power estimation apparatus according to an embodiment;

FIG. 7 is a flowchart of an example of a method of operating a system-level agent according to an embodiment;

FIG. 8 is a flowchart of an example of a method of operating a job-level agent according to an embodiment.

DESCRIPTION OF EMBODIMENTS

Figure 1:
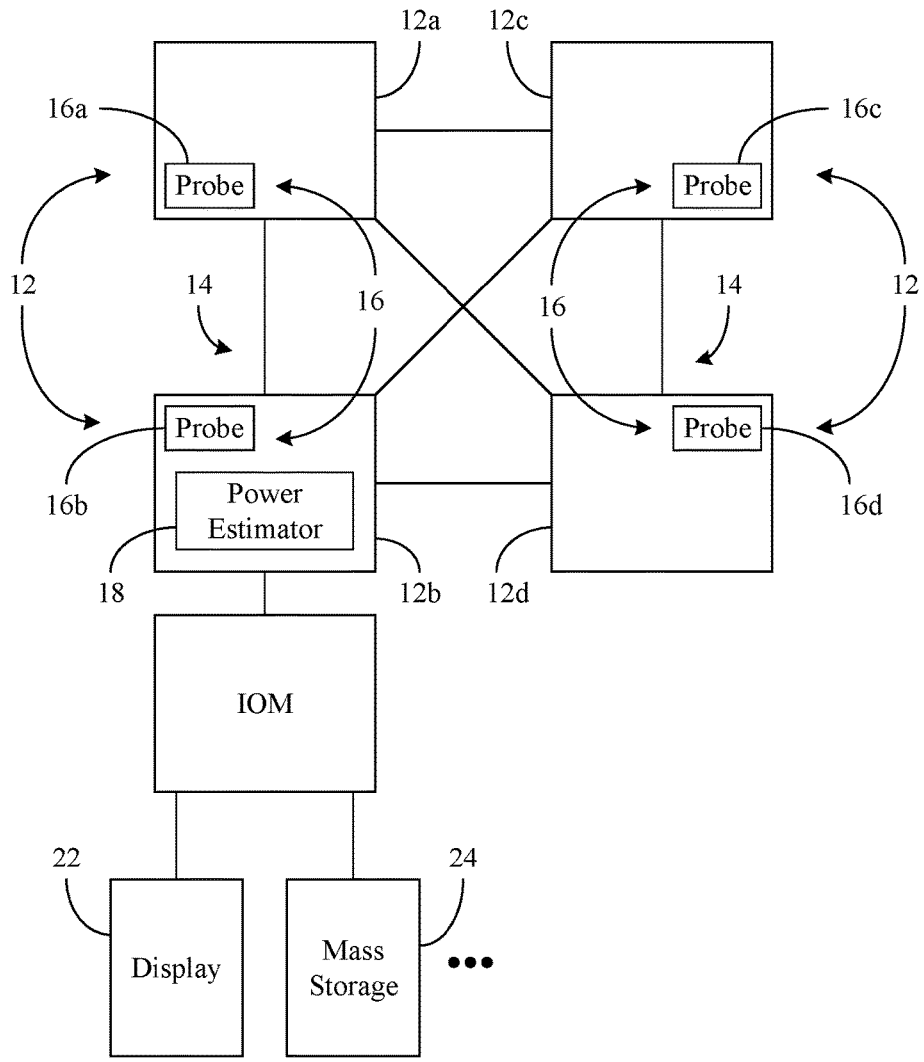
FIG. 1 is a block diagram of an example of a distributed computing system according to an embodiment.

Turning now to FIG. 1, a power bounded computing system 10 is shown in which a plurality of compute nodes 12 (12a-12d, including multi-core processors, controllers, chipsets, network routers, etc.) form a distributed computer that executes an application that may be partitioned into various jobs on a space and/or time basis. For example, if the computing system 10 has multiple users, a job may include a program, one or more inputs to the program, and a request for resources to run the program on behalf of a particular user. Thus, in a spatially partitioned example, a first compute node 12a and a second compute node 12b might execute a first job for a first user, whereas a third compute node 12c and a fourth compute node 12d may execute a second job for a second user. In a time partitioned example, the compute nodes 12 may each execute their respective portions of the first job and then, upon completion of the first job, execute their respective portions of the second job. Although only four compute nodes 12 are shown, the computing system 10 may be scaled to include many more compute nodes 12 in a large distributed computing scenario.

The illustrated compute nodes 12 are communicatively coupled to one another via a communications interface 14 such as, for example, a host fabric interface (HFI), a network interface card (NIC), and so forth. The computing system 10 may be considered to be power bounded to the extent that the operation of the computing system 10 is subject to power constraints. A plurality of probes 16 (16a-16d) may be used to measure network statistics at the compute node level, wherein the network statistics may be relevant to power consumption. The probes 16 may be implemented in a variety of different ways. For example, the probes 16 may include event counters that are maintained by processor or network hardware (e.g., accessible through standard hardware interface mechanisms), software event counters that are collected and maintained via instrumentation of network communication libraries (e.g., accessible through standard software interface mechanisms), etc., or any combination thereof. In one example, the network statistics information provided by the probes 16 includes bandwidth demand information. The probes 16 may also be used to collect other information such as, for example, performance telemetry and/or resource usage information.

As will be discussed in greater detail, a hierarchical power estimation apparatus 18 may aggregate network statistics information from the probes 16 and generate a power model that may in turn be used to allocate power among the compute nodes 12. The model may be an equation expressing estimated power as a function of network statistics and one or more coefficients, wherein the network power estimate may be obtained by merely computing the value of the equation on the inputs.

Of particular note is that the application executed by the computing system 10 may have distinct compute and communication behavior. For example, during compute behavior (e.g., compute phases), there may be very little demand for bandwidth in the communications interface 14. Accordingly, network power may be significantly reduced during the compute phases with little or no negative impact on application performance. However, during communication behavior (e.g., communication phases), the demand for bandwidth may be relatively high and maintaining or increasing the power reserved for the communications interface 14 may improve application run time performance. Being able to accurately and dynamically measure network demand and other key statistics may enable the system 10 to optimize power allocation per application phase (or per application) and improve overall performance. Such an approach represents a considerable improvement over conventional solutions that may naively estimate network power as the worst case power draw of network's at all times.

In the illustrated example, the second compute node 12b is coupled to an input/output module (TOM) that functions as a host interface to other system components such as, for example, a display 22 (e.g., organic light emitting diode/ OLED display, liquid crystal display/LCD), mass storage (e.g., solid state disk/SSD, hard disk drive/HDD), and so forth. The display 22 may visually present information associated with the power model generated by the power estimation apparatus 18. Moreover, the power estimation apparatus 18 may be distributed across two or more of the compute nodes 12 in the system 10.

While all agents in the hierarchy of the power estimation apparatus 18 may have similar responsibilities and designs, there are nuanced differences depending on the depth of the agent in the hierarchy. In general, there may be four types of agents in the design: a system-level agent (one per system); job-level agents (one per job currently running in the system); interior-level agents; and node-level agents (one in each compute node executing the job).

Figure 2:
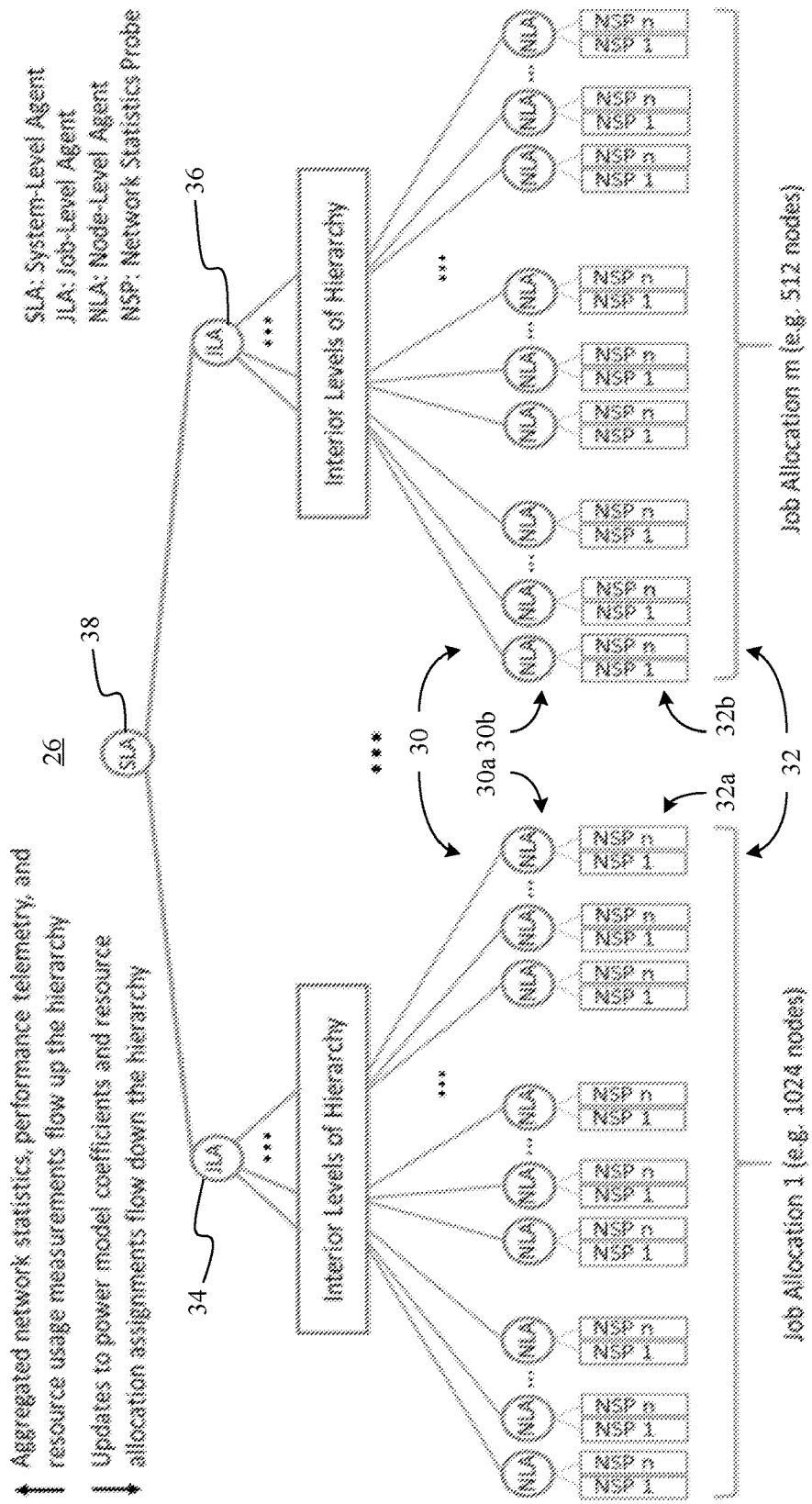
FIG. 2 is a block diagram of an example of a hierarchical power estimation apparatus according to an embodiment.

FIG. 2 shows a hierarchical power estimation apparatus 26. The apparatus 26 may be readily substituted for the power estimation apparatus 18 (FIG. 1), already discussed. The illustrated apparatus 26 includes a plurality of probes 32 (32a, 32b) associated with a communications interface such as, for example, the communications interface 14 (FIG. 1) and a plurality of node-level agents 30 (30a, 30a) that are partitioned into a first set of node-level agents 30a and a second set of node-level agents 30b. The first set of node-level agents 30a might be assigned to a particular job allocation (e.g., "Job Allocation 1", 1024 nodes) and the second set of node-level agents 30b may be assigned to another job allocation (e.g., "Job Allocation m", 512 nodes). Each node-level agent (NLA) 30 may aggregate network statistics information, performance telemetry information and/or resource usage information originating from at least one network statistics probe (NSP) 32.

One or more job-level agents 34, 36 may be communicatively coupled (e.g., via interior levels of hierarchy) to the plurality of node-level agents 30. In the illustrated example, a first job-level agent (JLA) 34 aggregates network statistics information from the first set of node-level agents 30a (e.g., for Job Allocation 1) and a second job-level agent 36 aggregates network statistics information from the second set of node-level agents 30b (e.g., for Job Allocation m). The illustrated apparatus 26 also includes a system-level agent (SLA) 38 communicatively coupled to the job-level agents 34, 36, wherein the system-level agent 38 generates a power model based on aggregated network statistics information from the job-level agents 34, 36. In one example, the power model includes coefficient data. The system-level agent 38 may also propagate the power model to the plurality of node-level agents 30 via the job-level agents 34, 36.

The illustrated apparatus 26 therefore monitors network statistics at the node level, aggregates network statistics across the system, and employs a model to estimate the network power of each compute node accurately based on the aggregated statistics and knowledge of the network topology. The apparatus 26 may be used in conjunction with a resource allocation management system (not shown) that, for example, adapts how much power is reserved for the communications interface so that maximum power may be steered to other hardware in order to maximize overall job performance within the power bound.

More particularly, the apparatus 26 may decompose the network statistics aggregation and power estimation problem hierarchically. In the hierarchy, each agent is responsible for aggregating inputs from the children of the agent and estimating the network power consumed by all of the compute nodes belonging to the subtree of the agent. Depending on the circumstances, the structure of the hierarchy may be many different topologies. As already noted, some examples may employ interior levels of agents in the hierarchy. The agents may be implemented in software, firmware, hardware, or a hybrid combination.

When used in conjunction with a hierarchical resource allocation management system, each agent may also be responsible for taking in a resource budget from a parent agent and deciding how best to partition that budget among the children of the agent based on their performance and resource usage feedback.

Figure 3:
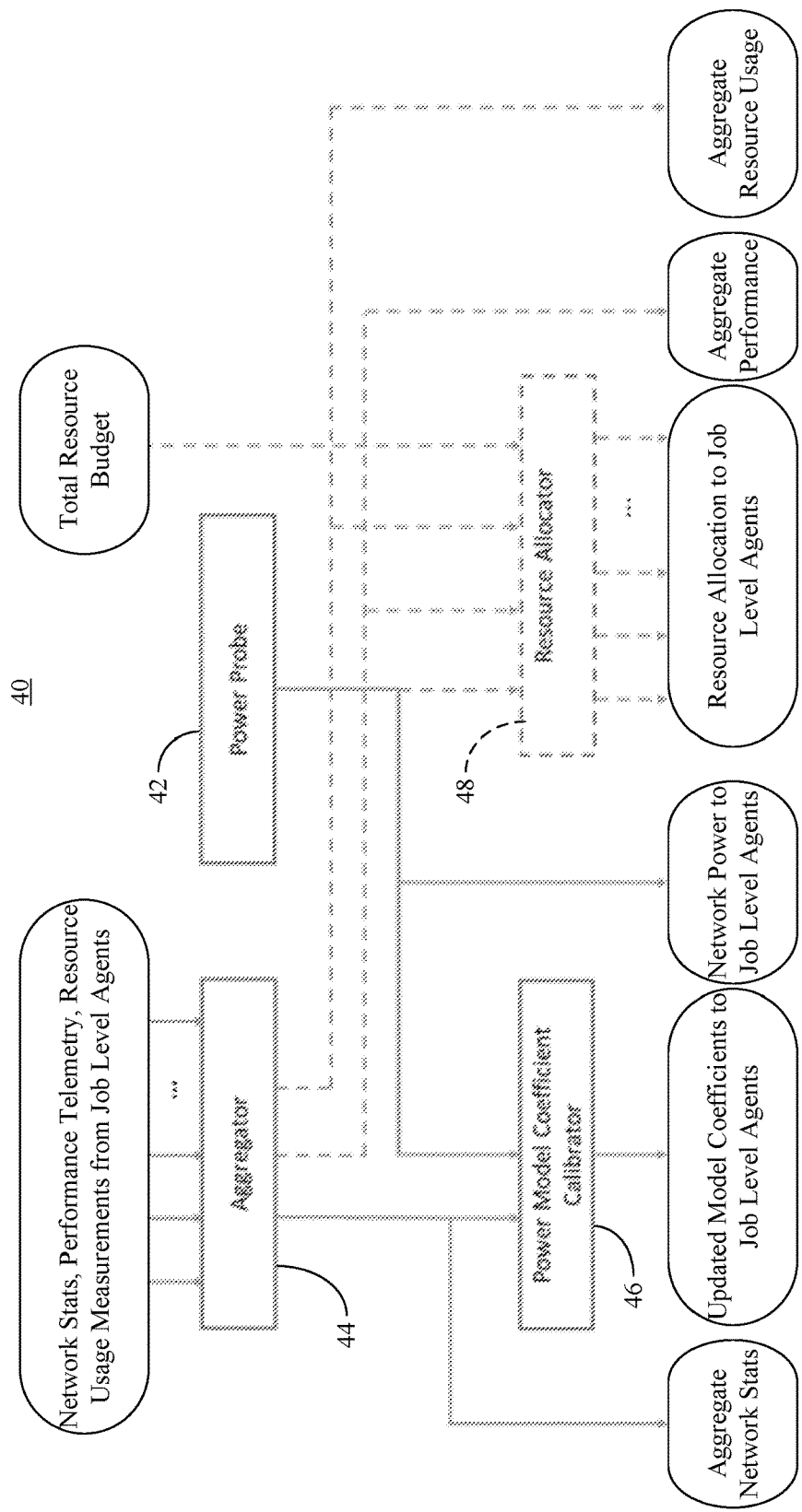
FIG. 3 is a block diagram of an example of a system-level agent according to an embodiment.

Turning now to FIG. 3, a system-level agent 40 is shown. The system-level agent 40 may be readily substituted for the system-level agent 38 (FIG. 2), already discussed. In the illustrated example, the system-level agent 40 includes a power probe 42 to sample network power (e.g. partial or total) and send the sampled network power to one or more job-level agents. In addition, the system-level agent 40 may include an aggregator 44 to receive aggregated network statistics information from the one or more job-level agents and a calibrator 46 communicatively coupled to the power probe 42 and the aggregator 44. The aggregator 44 may also accumulate performance telemetry information and resource usage measurements/information. The aggregation function may vary depending on the circumstances. In one example, the aggregation function is defined as a summation for aggregate network statistics, a minimum function for aggregate performance, and a summation for aggregate resource usage.

The calibrator 46 may generate coefficient data based on the sampled network power and aggregated network statistics information from the aggregator 44. The coefficient data may be part of the power model that is propagated to the node-level agents. The system-level agent 40 may optionally include a resource allocator 48 that generates resource allocations for one or more job-level agents based on a resource budget, sampled network power, and the aggregated network statistics, performance telemetry and resource usage information.

Figure 4:
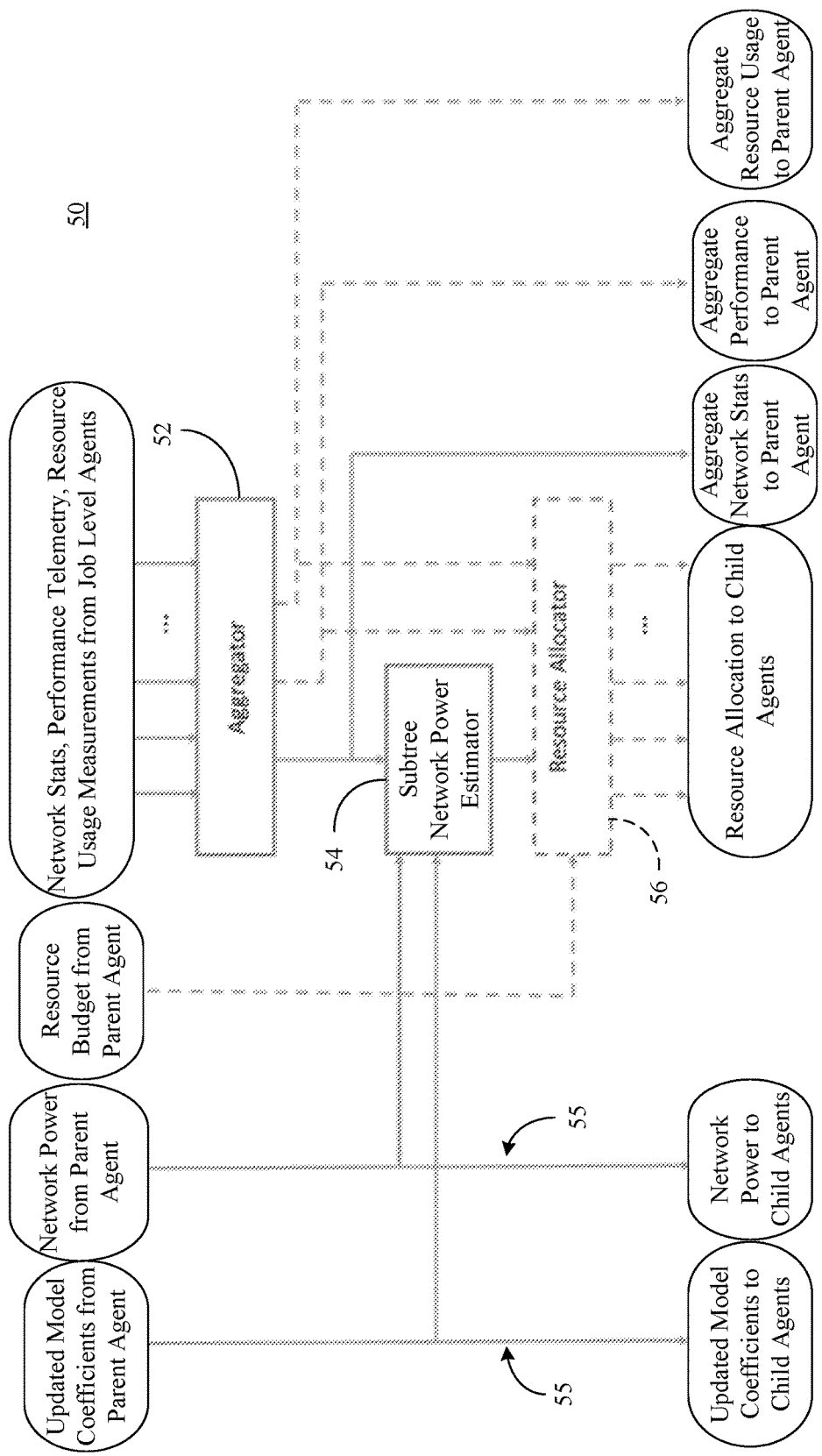
FIG. 4 is a block diagram of an example of a job-level agent according to an embodiment.

FIG. 4 shows a job-level agent 50 that may be readily substituted for either of the job-level agents 34, 36 (FIG. 2), already discussed. Since the job-level agent 50 is located in the interior of the hierarchy (e.g., between the "root" and the "leaves"), the job-level agent 50 may share the same design as all other interior-level agents. The agent 50 may be considered to be at a "job-level" to the extent that jobs are meaningful units in a multi-user computing system associated with the agent 50. At any time, the system may be partitioned in space and/or time among users, wherein the user submits a job to obtain a spatial or temporal share of the system to execute. As already noted, a program, the inputs to the program, and a request for resources to run the program, may collectively form a job.

In the illustrated example, an aggregator 52 receives aggregated network statistics from a plurality of child agents in the hierarchy. The child agents may be other interior-level agents and/or node-level agents, depending on the circumstances. The aggregator 52 may also receive performance telemetry information and/or resource usage information from the child agents. The job-level agent 50 may also include a power estimator 54 communicatively coupled to the aggregator 52, wherein the power estimator 54 may generate a power estimate based on coefficient data and sampled network power from a parent agent (e.g., an interior-level agent or a system-level agent) in the hierarchy and aggregated network statistics information from the aggregator 52. Additionally, one or more propagation paths 55 may forward the coefficient data and the sampled network power to the child agents. The illustrated job-level agent 50 also includes an optional resource allocator 56 that generates resource allocations for one or more child agents based on the estimated power, a resource budget, sampled network power, and the aggregated network statistics, performance telemetry and resource usage information.

Figure 5:
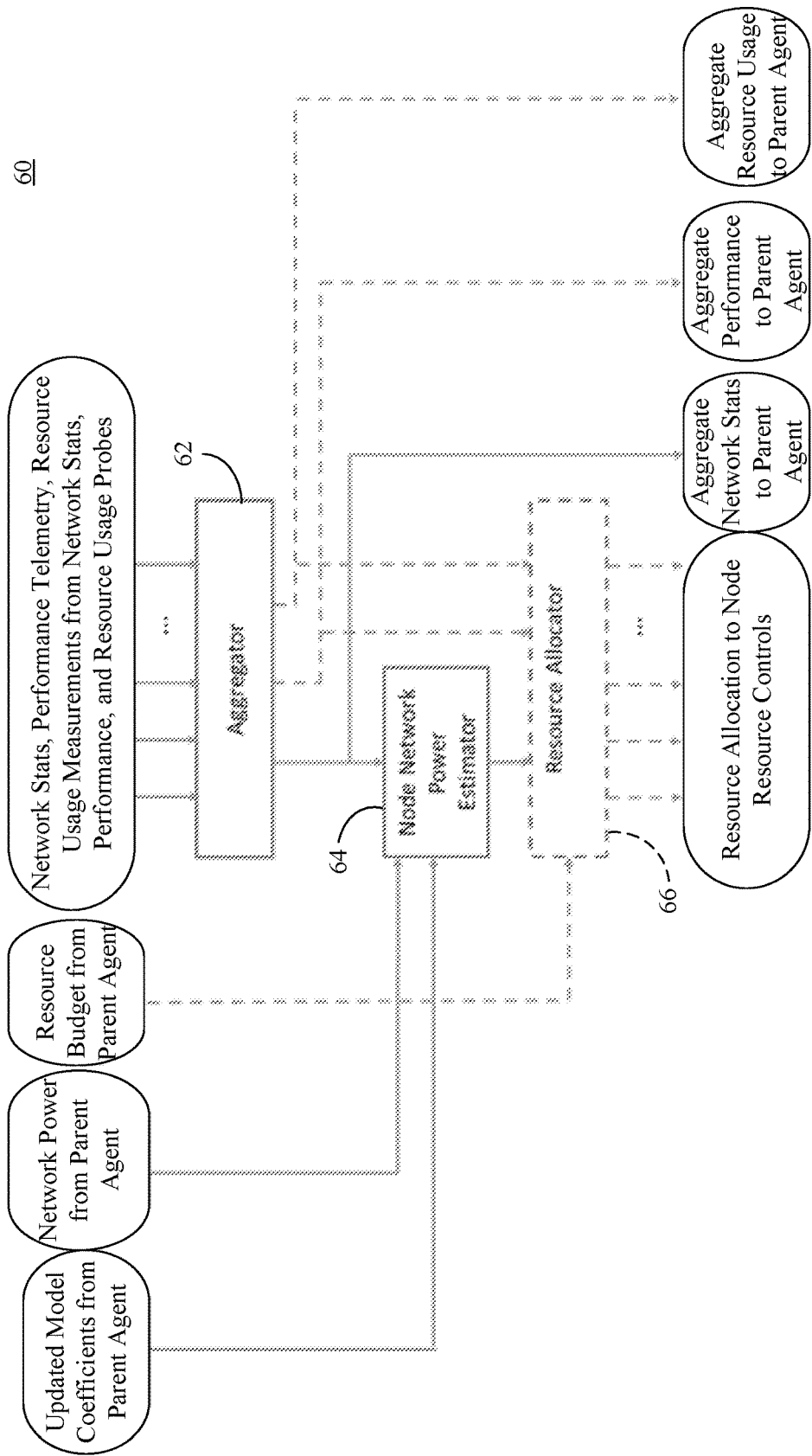
FIG. 5 is a block diagram of an example of a node-level agent according to an embodiment.

Turning now to FIG. 5, a node-level agent 60 is shown. The node-level agent 60 may be readily substituted for any of the node-level agents 30 (FIG. 2), already discussed. In the illustrated example, an aggregator 62 receives network statistics information from a plurality of probes. The aggregator 62 may also receive performance telemetry information and/or resource usage information from the plurality of probes. A power estimator 64 may be communicatively coupled to the aggregator 62, wherein the power estimator 64 may generate a power estimate based on coefficient data and sampled network power from a parent agent (e.g., a job-level agent, interior-level agent) in the hierarchy and aggregated network statistics information from the aggregator 62. The illustrated node-level agent 64 also includes an optional resource allocator 66 that generates resource allocations for one or more child agents (e.g., node resource controls) based on the estimated power, a resource budget, sampled network power, and the aggregated network statistics, performance telemetry and resource usage information.

The responsibilities of the aggregator 62, the power estimator 64 and the resource allocator 66 in the node-level agent 60 may be similar to their counterparts in the interior-level agents, with a few exceptions. One exception is that the power model and network power may not be propagated from the node-level agent 60 because there are no child agents to receive the propagated information. Moreover, the inputs to the illustrated aggregator 62 are obtained from network statistics probes, performance probes and resource usage probes rather than from child agents. Additionally, the resource allocation may be sent to node resource domains instead of child agents.

Power Model Generation

Depending on the type of network topology (e.g., dragonfly), the power model coefficient calibrator may assume that network power and bandwidth demand are related by the following linear equation:

$$P_{net,total} = P_{net,static} + P_{net,dynamic}$$
$$= c_1 + c_2 * \frac{BW_{demand,total}}{BW_{max}}$$

Since $BW_{max}$ is a constant (e.g., dependent on the network), the constant factors may be folded together:

$$P_{net,total} = c_1 + c_2 * BW_{demand,total}$$

Where $c_1$ and $c_2$ are the coefficients of the linear model. Different examples may use different methods to learn the coefficients of the model. In one example, time series analysis and a recursive least squares strategy may be used to a) predict network power as a function of a short history of network bandwidth demand, and b) tune the coefficients to minimize the difference between predictions and measurements of network power.

Depending on the system network topology, an equation of a different form may be used. Moreover, depending on the form of the equation, different methods of learning the best coefficients for the model may be applied. In cases where the equation is non-linear, a numerical solver or other general regression techniques may be used to find the ideal coefficients instead of using time series analysis.

FIG. 6 shows a method 68 of operating a hierarchical power estimation apparatus. The method 68 may generally be implemented in a hierarchical power estimation apparatus such as, for example, the estimation apparatus 26 (FIG. 2), already discussed. More particularly, the method 68 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 68 may be written in any combination of one or more programming languages, including an object oriented programming language such as JAVA, SMALLTALK, C++ or the like and conventional procedural programming languages, such as the "C" programming language or similar programming languages.

Illustrated processing block 70 may provide for aggregating, at each node-level agent of a plurality of node-level agents, network statistics information from a plurality of probes associated with a communications interface. Additionally, block 72 may aggregate, at each job-level agent of one or more job-level agents communicatively coupled to the plurality of node-level agents, network statistics information from two or more of the plurality of node-level agents. Illustrated block 74 generates, at a system-level agent communicatively coupled to the one or more job-level agents, a power model based on aggregated network statistics information from the one or more job-level agents. The power model may be propagated at block 76 to the plurality of node-level agents via the one or more job-level agents. As already noted, the network statistics information may include bandwidth demand information. Moreover, the network statistics information may be associated with one or more applications having distinct compute and communication behavior.

FIG. 7 shows a method 78 of operating a system-level agent. The method 78 may generally be implemented in a system-level agent such as, for example, the system-level agent 40 (FIG. 3), already discussed. More particularly, the method 78 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 80 provides for sampling, at a power probe of the system-level agent, network power, wherein the sampled network power may be sent to one or more job-level agents at block 82. As will be discussed in greater detail, the sampled network power may represent total or partial network power, depending on the circumstances. Block 84 may receive, at an aggregator of the system-level agent, aggregated network statistics information from the one or more job-level agents. Additionally, illustrated block 86 generates, at a calibrator of the system-level agent, coefficient data based on the sampled network power and aggregated network statistics information from the aggregator, wherein the power model includes the coefficient data.

FIG. 8 shows a method of operating a job-level agent. The method 88 may generally be implemented in a job-level agent such as, for example, the job-level agent 50 (FIG. 4), already discussed. More particularly, the method 88 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 90 provides for receiving, at an aggregator of each job-level agent, aggregated network statistics information from a plurality of child agents. Block 92 may generate, at a power estimator of each job-level agent, a power estimate based on coefficient data and sampled network power from a parent agent and aggregated network statistics information from the aggregator. Additionally, the coefficient data and the sampled network power may be forwarded, via one or more propagation paths of each job-level agent, to the plurality of child agents at block 93.

As already noted, the sampled network power may represent the total or partial network power. In the case of partial network power, agents in the tree may be communicatively coupled to network power probes covering portions of the network hardware. For example, each network switch in the system might be attached to a power probe. Moreover, network switches are typically shared resources that many nodes connect to, so there may not be a 1:1 mapping between network power probes and agents in the tree, in general. The switch power may also be affected by nodes that may not be in the subtree of a given agent. In such a case, the agents may include logic to estimate what fraction of the power was due to the nodes in their subtree. This estimation logic may coexist with the power model so that power estimates from the power model may be augmented/refined with estimates derived from partial network power probes.

Figure 9:
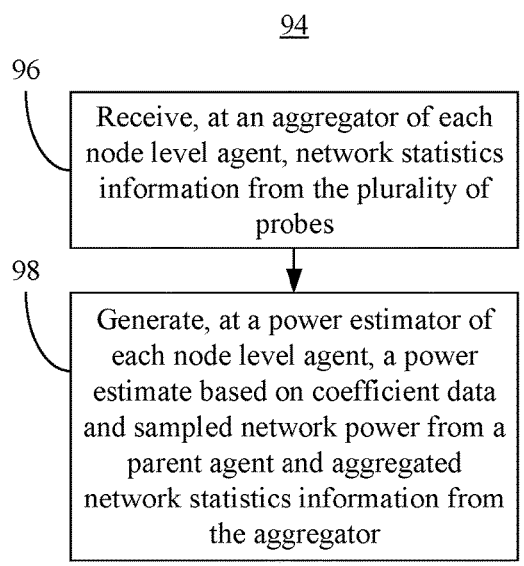
FIG. 9 is a flowchart of an example of a method of operating a node-level agent according to an embodiment.

FIG. 9 shows a method of operating a node-level agent. The method 94 may generally be implemented in a node-level agent such as, for example, the node-level agent 60 (FIG. 5), already discussed. More particularly, the method 94 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 96 provides for receiving, at an aggregator of each node-level agent, network statistics information from a plurality of probes. Block 98 may generate, at a power estimator of each node-level agent, a power estimate based on coefficient data and sampled network power from a parent agent and aggregated network statistics information from the aggregator.

If the hierarchical power estimation apparatus is integrated with a hierarchical resource allocator, the methods illustrated in FIGS. 6-9 may also aggregate performance telemetry and resource usage information at the aggregators of the node, intermediate and system levels.

ADDITIONAL NOTES AND EXAMPLES

Example 1 may include a power bounded computing system comprising at least a portion of a communications interface, a plurality of node-level agents, each node-level agent to aggregate network statistics information from a plurality of probes associated with the communications interface, one or more job-level agents communicatively coupled to the plurality of node-level agents, each job-level agent to aggregate network statistics information from two or more of the plurality of node-level agents, a system-level agent communicatively coupled to the one or more job-level agents, the system-level agent to generate a power model based on aggregated network statistics information from the one or more job-level agents and propagate the power model to the plurality of node-level agents via the one or more job-level agents, and a display to visually present information associated with the power model.

Example 2 may include the system of Example 1, wherein the system-level agent includes a power probe to sample network power and send the sampled network power to the one or more job-level agents, an aggregator to receive aggregated network statistics information from the one or more job-level agents, and a calibrator communicatively coupled to the power probe and the aggregator, the calibrator to generate coefficient data based on the sampled network power and aggregated network statistics information from the aggregator, wherein the power model includes the coefficient data.

Example 3 may include the system of Example 1, wherein each job-level agent includes an aggregator to receive aggregated network statistics information from a plurality of child agents, a power estimator communicatively coupled to the aggregator, the power estimator to generate a power estimate based on coefficient data and sampled network power from a parent agent and aggregated network statistics information from the aggregator, and one or more propagation paths to forward the coefficient data and the sampled network power to the plurality of child agents.

Example 4 may include the system of Example 1, wherein each node-level agent includes an aggregator to receive network statistics information from the plurality of probes, and a power estimator communicatively coupled to the aggregator, the power estimator to generate a power estimate based on coefficient data and sampled network power from a parent agent and aggregated network statistics information from the aggregator.

Example 5 may include the system of any one of Examples 1 to 4, wherein the network statistics information is to include bandwidth demand information.

Example 6 may include the system of any one of Examples 1 to 4, wherein the network statistics information is to be associated with one or more applications having distinct compute and communication behavior.

Example 7 may include the system of any one of Examples 1 to 4, wherein the communications interface includes one or more of a host fabric interface or a network interface card.

Example 8 may include a hierarchical power estimation apparatus comprising a plurality of node-level agents, each node-level agent to aggregate network statistics information from a plurality of probes associated with a communications interface, one or more job-level agents communicatively coupled to the plurality of node-level agents, each job-level agent to aggregate network statistics information from two or more of the plurality of node-level agents, and a system-level agent communicatively coupled to the one or more job-level agents, the system-level agent to generate a power model based on aggregated network statistics information from the one or more job-level agents and propagate the power model to the plurality of node-level agents via the one or more job-level agents.

Example 9 may include the apparatus of Example 8, wherein the system-level agent includes a power probe to sample network power and send the sampled network power to the one or more job-level agents, an aggregator to receive aggregated network statistics information from the one or more job-level agents, and a calibrator communicatively coupled to the power probe and the aggregator, the calibrator to generate coefficient data based on the sampled network power and aggregated network statistics information from the aggregator, wherein the power model includes the coefficient data.

Example 10 may include the apparatus of Example 8, wherein each job-level agent includes an aggregator to receive aggregated network statistics information from a plurality of child agents, a power estimator communicatively coupled to the aggregator, the power estimator to generate a power estimate based on coefficient data and sampled network power from a parent agent and aggregated network statistics information from the aggregator, and one or more propagation paths to forward the coefficient data and the sampled network power to the plurality of child agents.

Example 11 may include the apparatus of Example 8, wherein each node-level agent includes an aggregator to receive network statistics information from the plurality of probes, and a power estimator communicatively coupled to the aggregator, the power estimator to generate a power estimate based on coefficient data and sampled network power from a parent agent and aggregated network statistics information from the aggregator.

Example 12 may include the apparatus of any one of Examples 8 to 11, wherein the network statistics information is to include bandwidth demand information.

Example 13 may include the apparatus of any one of Examples 8 to 11, wherein the network statistics information is to be associated with one or more applications having distinct compute and communication behavior.

Example 14 may include a method of operating a hierarchical power estimation apparatus comprising aggregating, at each node-level agent of a plurality of node-level agents, network statistics information from a plurality of probes associated with a communications interface, aggregating, at each job-level agent of one or more job-level agents communicatively coupled to the plurality of node-level agents, network statistics information from two or more of the plurality of node-level agents, generating, at a system-level agent communicatively coupled to the one or more job-level agents, a power model based on aggregated network statistics information from the one or more job-level agents, and propagating the power model to the plurality of node-level agents via the one or more job-level agents.

Example 15 may include the method of Example 14, further including sampling, at a power probe of the system-level agent, network power, sending the sampled network power to the one or more job-level agents, receiving, at an aggregator of the system-level agent, aggregated network statistics information from the one or more job-level agents, and generating, at a calibrator of the system-level agent, coefficient data based on the sampled network power and aggregated network statistics information from the aggregator, wherein the power model includes the coefficient data.

Example 16 may include the method of Example 14, further including receiving, at an aggregator of each job-level agent, aggregated network statistics information from a plurality of child agents, generating, at a power estimator of each job-level agent, a power estimate based on coefficient data and sampled network power from a parent agent and aggregated network statistics information from the aggregator, and forwarding, via one or more propagation paths of each job-level agent, the coefficient data and the sampled network power to the plurality of child agents.

Example 17 may include the method of Example 14, further including receiving, at an aggregator of each node-level agent, network statistics information from the plurality of probes, and generating, at a power estimator of each node-level agent, a power estimate based on coefficient data and sampled network power from a parent agent and aggregated network statistics information from the aggregator.

Example 18 may include the method of any one of Examples 14 to 17, wherein the network statistics information includes bandwidth demand information.

Example 19 may include the method of any one of Examples 14 to 17, wherein the network statistics information is associated with one or more applications having distinct compute and communication behavior.

Example 20 may include at least one computer readable storage medium comprising a set of instructions, which when executed by a computing system, cause the computing system to aggregate, at each node-level agent of a plurality of node-level agents, network statistics information from a plurality of probes associated with a communications interface, aggregate, at each job-level agent of one or more job-level agents communicatively coupled to the plurality of node-level agents, network statistics information from two or more of the plurality of node-level agents, generate, at a system-level agent communicatively coupled to the one or more job-level agents, a power model based on aggregated network statistics information from the one or more job-level agents, and propagate the power model to the plurality of node-level agents via the one or more job-level agents.

Example 21 may include the at least one computer readable storage medium of Example 20, wherein the instructions, when executed, cause a computing system to sample, at a power probe of the system-level agent, network power, send the sampled network power to the one or more job-level agents, receive, at an aggregator of the system-level agent, aggregated network statistics information from the one or more job-level agents, and generate, at a calibrator of the system-level agent, coefficient data based on the sampled network power and aggregated network statistics information from the aggregator, wherein the power model is to include the coefficient data.

Example 22 may include the at least one computer readable storage medium of Example 20, wherein the instructions, when executed, cause a computing system to receive, at an aggregator of each job-level agent, aggregated network statistics information from a plurality of child agents, generate, at a power estimator of each job-level agent, a power estimate based on coefficient data and sampled network power from a parent agent and aggregated network statistics information from the aggregator, and forward, via one or more propagation paths of each job-level agent, the coefficient data and the sampled network power to the plurality of child agents.

Example 23 may include the at least one computer readable storage medium of Example 20, wherein the instructions, when executed, cause a computing system to receive, at an aggregator of each node-level agent, network statistics information from the plurality of probes, and generate, at a power estimator of each node-level agent, a power estimate based on coefficient data and sampled network from a parent agent and aggregated network statistics information from the aggregator.

Example 24 may include the at least one computer readable storage medium of any one of Examples 20 to 23, wherein the network statistics information is to include bandwidth demand information.

Example 25 may include the at least one computer readable storage medium of any one of Examples 20 to 23, wherein the network statistics information is to be associated with one or more applications having distinct compute and communication behavior.

Example 26 may include a hierarchical power estimation apparatus comprising means for aggregating, at each node-level agent of a plurality of node-level agents, network statistics information from a plurality of probes associated with a communications interface, means for aggregating, at each job-level agent of one or more job-level agents communicatively coupled to the plurality of node-level agents, network statistics information from two or more of the plurality of node-level agents, means for generating, at a system-level agent communicatively coupled to the one or more job-level agents, a power model based on aggregated network statistics information from the one or more job-level agents, and means for propagating the power model to the plurality of node-level agents via the one or more job-level agents.

Example 27 may include the apparatus of Example 26, further including means for sampling, at a power probe of the system-level agent, network power, means for sending the sampled network power to the one or more job-level agents, means for receiving, at an aggregator of the system-level agent, aggregated network statistics information from the one or more job-level agents, and means for generating, at a calibrator of the system-level agent, coefficient data based on the sampled network power and aggregated network statistics information from the aggregator, wherein the power model includes the coefficient data.

Example 28 may include the apparatus of Example 26, further including means for receiving, at an aggregator of each job-level agent, aggregated network statistics information from a plurality of child agents, and means for generating, at a power estimator of each job-level agent, a power estimate based on coefficient data and sampled network power from a parent agent and aggregated network statistics information from the aggregator.

Example 29 may include the apparatus of Example 26, further including means for receiving, at an aggregator of each node-level agent, network statistics information from the plurality of probes, and means for generating, at a power estimator of each node-level agent, a power estimate based on coefficient data and sampled network power from a parent agent and aggregated network statistics information from the aggregator.

Example 30 may include the apparatus of any one of Examples 26 to 29, wherein the network statistics information is to include bandwidth demand information.

Example 31 may include the apparatus of any one of Examples 26 to 29, wherein the network statistics information is to be associated with one or more applications having distinct compute and communication behavior.

Techniques described herein may therefore solve problems associated with high network fabric power consumption of exascale computers (e.g., computers capable of at least one billion billion calculations per second) and other large HPC (high performance computing) installations. More particularly, techniques described herein may prevent such systems from being power limited by minimizing power consumption in the network fabric while maximizing overall throughput. Techniques described herein may also maximize the benefits of resource allocation and power management products that support HPC and supercomputer software stacks.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Moreover, the term "plurality" with respect to a particular item may not necessarily refer to all items present in a given solution and may rather simply be considered two or more items. Similarly, the term "each" in reference to a plurality of items may not necessarily refer to all items in a given solution and may rather simply be considered one or more items.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
at least a portion of a communications interface over which communication is to occur during execution of one or more applications having distinct compute and communication behavior;
a plurality of node-level agents, to execute the one or more applications, each node-level agent to aggregate network statistics information from a plurality of probes associated with the communications interface;
one or more job-level agents communicatively coupled to the plurality of node-level agents, each job-level agent to aggregate network statistics information from two or more of the plurality of node-level agents;
a system-level agent communicatively coupled to the one or more job-level agents, the system-level agent to generate a power model based on aggregated network statistics information from the one or more job-level agents and propagate the power model to the plurality of node-level agents via the one or more job-level agents, wherein the power model is to model network power, that is used to communicate over the communication interface, based on bandwidth demand, wherein the system-level agent includes a power probe to sample network power and send the sampled network power to the one or more job-level agents; and
a display to visually present information associated with the power model, wherein:
the node-level agents are to allocate power to node resource controls associated with the node-level agents based on the power model received from the system-level agent so that power reserved for the communication interface is reduced during the compute behavior, and the power reserved for the communication interface is increased during the communication behavior;
each of the one or more job-level agents is to receive the sampled network power, determine a group power allocation for a group of the node-level agents, that are child agents of the job-level agent, based on the sampled network power and provide the group power allocation and the sampled network power to each of the node-level agents of the group; and
each node-level agent is to receive the sampled network power and the group power allocation from a respective one of the one or more job level agents, and determine an allocation of power for one or more of the node resource controls based on the sampled network power and the group power allocation.

2. The system of claim 1, wherein the system-level agent includes:
an aggregator to receive aggregated network statistics information from the one or more job-level agents; and
a calibrator communicatively coupled to the power probe and the aggregator, the calibrator to generate coefficient data based on the sampled network power and aggregated network statistics information from the aggregator, wherein the power model includes the coefficient data.

3. The system of claim 1, wherein each job-level agent includes:
an aggregator to receive aggregated network statistics information from the group of the node-level agents that are the child agents of the job-level agent;
a power estimator communicatively coupled to the aggregator, the power estimator to generate a power estimate based on coefficient data, the sampled network power and aggregated network statistics information from the aggregator; and
one or more propagation paths to forward the coefficient data and the sampled network power to the group of the node-level agents that are the child agents of the job-level agent.

4. The system of claim 1, wherein each node-level agent includes:
an aggregator to receive network statistics information from the plurality of probes; and
a power estimator communicatively coupled to the aggregator, the power estimator to generate a power estimate based on coefficient data, the sampled network power and aggregated network statistics information from the aggregator.

5. The system of claim 1, wherein the network statistics information from the plurality of probes is to include bandwidth demand information.

6. The system of claim 1, wherein the communications interface includes one or more of a host fabric interface or a network interface card.

7. An apparatus comprising:
a plurality of node-level agents to execute one or more applications having distinct compute and communication behavior, each node-level agent to aggregate network statistics information from a plurality of probes associated with a communications interface over which communication occurs during execution of the one or more applications;
one or more job-level agents communicatively coupled to the plurality of node-level agents, each job-level agent to aggregate network statistics information from two or more of the plurality of node-level agents; and
a system-level agent communicatively coupled to the one or more job-level agents, the system-level agent to generate a power model based on aggregated network statistics information from the one or more job-level agents and propagate the power model to the plurality of node-level agents via the one or more job-level agents, wherein the power model is to model network power, that is used to communicate over the communication interface, based on bandwidth demand, wherein the system-level agent includes a power probe to sample network power and send the sampled network power to the one or more job-level agents, and wherein:
the node-level agents are to allocate power to node resource controls associated with the node-level agents based on the power model received from the system-level agent so that power reserved for the communication interface is reduced during the compute behavior, and the power reserved for the communication interface is increased during the communication behavior;
each of the one or more job-level agents is to receive the sampled network power, determine a group power allocation for a group of the node-level agents, that are child agents of the job-level agent, based on the sampled network power and provide the group power allocation and the sampled network power to each of the node-level agents of the group; and each node-level agent is to receive the sampled network power and the group power allocation from a respective one of the one or more job level agents, and determine an allocation of power for one or more of the node resource controls based on the sampled network power and the group power allocation.

8. The apparatus of claim 7, wherein the system-level agent includes:
an aggregator to receive aggregated network statistics information from the one or more job-level agents; and
a calibrator communicatively coupled to the power probe and the aggregator, the calibrator to generate coefficient data based on the sampled network power and aggregated network statistics information from the aggregator, wherein the power model includes the coefficient data.

9. The apparatus of claim 7, wherein each job-level agent includes:
an aggregator to receive aggregated network statistics information from the group of the node-level agents that are the child agents of the job-level agent;
a power estimator communicatively coupled to the aggregator, the power estimator to generate a power estimate based on coefficient data, the sampled network power and aggregated network statistics information from the aggregator; and
one or more propagation paths to forward the coefficient data and the sampled network power to the group of the node-level agents that are the child agents of the job-level agent.

10. The apparatus of claim 7, wherein each node-level agent includes:
an aggregator to receive network statistics information from the plurality of probes; and
a power estimator communicatively coupled to the aggregator, the power estimator to generate a power estimate based on coefficient data, the sampled network power and aggregated network statistics information from the aggregator.

11. The apparatus of claim 7, wherein the network statistics information from the plurality of probes is to include bandwidth demand information.

12. At least one computer readable storage medium comprising a set of instructions, which when executed by a computing system, cause the computing system to:
execute, at a plurality of node-level agents, one or more applications having distinct compute and communication behavior;
aggregate, at each node-level agent of the plurality of node-level agents, network statistics information from a plurality of probes associated with a communications interface over which communication is to occur during execution of the one or more applications;
aggregate, at each job-level agent of one or more job-level agents communicatively coupled to the plurality of node-level agents, network statistics information from two or more of the plurality of node-level agents;
generate, at a system-level agent communicatively coupled to the one or more job-level agents, a power model based on aggregated network statistics information from the one or more job-level agents, wherein the power model is to model network power, that is used to communicate over the communication interface, based on bandwidth demand;

propagate the power model to the plurality of node-level agents via the one or more job-level agents;
allocate power, at the node-level agents, to node resource controls associated with the node-level agents based on the power model received from the system-level agent so that power reserved for the communication interface is reduced during the compute behavior, and the power reserved for the communication interface is increased during the communication behavior;
sample, at a power probe of the system-level agent, network power;
send the sampled network power to each of the one or more job-level agents and the node-level agents;
determine, at the one or more job-level agents, a group power allocation for a group of the node-level agents based on the sampled network power; and
determine, at the group of the node-level agents, an allocation of power for one or more of the node resource controls based on the sampled network power and the group power allocation.

13. The at least one computer readable storage medium of claim 12, wherein the instructions, when executed, cause a computing system to:
receive, at an aggregator of the system-level agent, aggregated network statistics information from the one or more job-level agents; and
generate, at a calibrator of the system-level agent, coefficient data based on the sampled network power and aggregated network statistics information from the aggregator, wherein the power model is to include the coefficient data.

14. The at least one computer readable storage medium of claim 12, wherein the instructions, when executed, cause a computing system to:
receive, at an aggregator of each job-level agent, aggregated network statistics information from a plurality of the node-level agents that are child agents of the job-level agent;
generate, at a power estimator of each job-level agent, a power estimate based on coefficient data, the sampled network power and aggregated network statistics information from the aggregator; and
forward, via one or more propagation paths of each job-level agent, the coefficient data and the sampled network power to the plurality of the node-level agents that are child agents of the job-level agent.

15. The at least one computer readable storage medium of claim 12, wherein the instructions, when executed, cause a computing system to:
receive, at an aggregator of each node-level agent, network statistics information from the plurality of probes; and
generate, at a power estimator of each node-level agent, a power estimate based on coefficient data, the sampled network power and aggregated network statistics information from the aggregator.

16. The at least one computer readable storage medium of claim 12, wherein the network statistics information from the plurality of probes is to include bandwidth demand information.

17. The system of claim 1, wherein:
each of the one or more job-level agents is to determine a group network power estimation for the group of the node-level agents, that are the child agents of the job-level agent, based on the power model and the sampled network power, and determine the group power allocation for the group of the node-level agents based on the group network power estimation; and each node-level agent is to determine a node network power estimation from the power model and the sampled network power, and determine the allocation of power for the one or more of the node resource controls based on the node network power estimation.

18. The apparatus of claim 7, wherein:

each of the one or more job-level agents is to determine a group network power estimation for the group of the node-level agents, that are the child agents of the job-level agent, based on the power model and the sampled network power, and determine the group power allocation for the group of the node-level agents based on the group network power estimation; and each node-level agent is to determine a node network power estimation from the power model and the sampled network power, and determine the allocation of power for the one or more of the node resource controls based on the node network power estimation.

19. The at least one computer readable storage medium of claim 12, wherein the instructions, when executed, cause a computing system to:

determine, at the one or more job-level agents, a group network power estimation for the group of the node-level agents based on the power model and the sampled network power;

determine, at the one or more job-level agents, the group power allocation for the group of the node-level agents based on the group network power estimation;

determine, at the group of node-level agents, a node network power estimation from the power model and the sampled network power; and determine, at the group of the node-level agents, the allocation of power for the one or more of the node resource controls based on the node network power estimation.

* * * * *